Patented June 25, 1935

2,006,189

UNITED STATES PATENT OFFICE 2,006,189

OIL SOLUBLE RESIN

Victor H. Turkington, Caldwell, N. J., assignor to Bakelite Corporation, New York, N. Y., a corporation of Delaware No Drawing. Application December 13, 1930, Serial No. 502,260

3 Claims. (Cl. 260—4)

This invention relates to synthetic resins of the phenolic type soluble in fatty oils, that is, resins compatible or miscible with tung oil, linseed oil and similar drying or fatty oils found useful in the preparation of coating compositions. The inclusion of phenolic resins so characterized in oil-coating compositions is found to be useful for the reason that the drying period of the coating composition is accelerated and toughness, alkali resistance, etc. are imparted to films deposited by such compositions. The commonly known phenolic resins, that is the phenol or cresol-formaldehyde condensation products are not soluble in oils but it has been found that they can be made so by digesting them with at least an equal amount of rosin. Rosin however is not a desirable addition as it offsets the useful properties of the phenolic resin and results in an inferior composition.

In a prior application of Turkington and Butler filed July 29, 1929 Serial Number 336,007 there are described phenolic resins which in themselves exhibit the property of oil solubility without necessitating the addition of rosin or other deleterious agent. These resins more particularly comprise the products obtained by the condensation with formaldehyde or its equivalent of phenolic bodies containing two or more benzene rings including the aryl-substituted phenols such as phenyl-phenols including dicresols, etc. and condensed nuclei phenols such as naphthols.

I have now found that phenols having two or more benzene rings and one or more of the rings hydrogenated also yield resins with the oil-soluble characteristic when condensed with formaldehyde or other methylene-containing agent. The cyclic-substituted or hydrogenated phenols found particularly desirable in this respect are the cyclo-hexyl phenols. These resins are readily soluble in the usual drying oils to thereby produce coatings of a high resistance to weathering, moisture, weak alkalies, acids and other corrosive materials. The resins are water-white in color and withstand temperatures up to 200° C. without serious darkening. The resins are also compatible with cellulose esters and therefore useful in nitrocellulose or cellulose acetate lacquers, to improve durability, gloss, adhesion and resistance to moisture.

A resin representative of this type is made by heating 100 parts by weight of para-cyclo-hexyl-phenol, 60 parts commercial formaldehyde and 1 part oxalic acid as a catalyst under a reflux condenser until good separation of resin and water occurs; this generally happens in about 8 hours. An excess of formaldehyde to 100 parts or more can be included, and other methylene-containing or formaldehyde-releasing agents can be substituted. Acid catalysts are preferred on account of the light color of the resulting resin; but basic catalysts can be used or the reaction carried out without any catalyst particularly if pressure is applied to the mass. The water is then distilled off and the resin is preferably heated to 150° C. to insure its anhydrous condition. The product is a clear, light colored, hard resin and readily soluble in fatty oils.

A coating composition can be prepared from this resin by heating 100 parts with 80 parts of China-wood oil to 200° C. and the mixture held at this temperature until a sample on cooling is a tough, non-tacky solid. The mixture is then dissolved in a suitable solvent such as solvent naphtha. The coating composition thus obtained yields a film which dries in a few minutes simply by evaporation of the solvent to a non-tacky and fairly hard condition. Final hardness of the film can be increased by including a small proportion (0.1 to 1.0% or more) of metallic drier as for example a cobalt drier in the coating composition.

There is nothing critical about the proportion of resin to fatty oil. For example 100 parts of the above-mentioned resin can be heated with 300 parts of China-wood oil to about 250° C. and held at this temperature for a short period. The composition is then thinned with solvents such as mineral spirits, xylol, mono-ethyl ether of glycol, etc. to their mixture, and a small quantity of metallic drier can be included. This product gives a very flexible type of coating suitable for use as a spar or finishing varnish; due to the long oil content it dries by combined oxidation and polymerization as well as by evaporation of the volatile solvent.

Other fatty oils can be substituted in whole or in part for tung oil including linseed, soya bean, corn, perilla, castor, rapeseed, fish oils etc. Likewise oils containing material amounts of free fatty acids, such as blown oils, can be used for the greater the acid number the more readily solution takes place. For a like reason free fatty acids, oleic, linolic, linolenic, etc. or their mixtures yield resinous products.

As an illustration of the use of a resin of this type in the preparation of lacquers, 50 parts of the resin described is mixed with 50 parts of low viscosity nitrocellulose (½ sec.) in solvent such, as for example, a mixture comprising 150 parts of toluol, 100 parts of butyl acetate, 50 parts of ethyl acetate and 20 parts of butanol; it may be found desirable to include a plasticizer, as for instance, 8 parts of tricresyl phosphate. This composition gives a clear nitrocellulose lacquer which dries in a few minutes at room temperature to a hard, tough and durable coating. The proportion of resin included in the lacquer may be varied to any desired degree, the solvents being correspondingly proportioned to prevent separation of resin or cellulose nitrate from the solution. Other esters of cellulose can be substituted with the use of solvents suitable to such esters.

Hydrogenated phenols available at the present time are restricted to cyclo-hexyl phenols, and the resins that can be prepared are correspondingly limited. However experiments conducted with hydrogenated β naphthols show similar results thereby pointing to hydrogenated multiple ring phenols of both the aryl-substituted and the condensed nuclei types as phenolic bodies engendering resins of the oil-soluble type.

I claim:

1. Synthetic resin characterized by solubility in fatty oils and comprising a condensation product of a methylene-containing agent and a cyclo-hexyl phenol of the monohydroxy type.

2. Synthetic resin characterized by solubility in fatty oil and comprising a condensation product of a methylene-containing agent and a para-cyclo-hexyl phenol of the monohydroxy type.

3. Method of preparing synthetic resins soluble in fatty oils which comprises reacting with a methylene-containing agent a cyclo-hexyl phenol of the monohydroxy type.

VICTOR H. TURKINGTON.